United States Patent
Kim et al.

(10) Patent No.: US 8,355,589 B2
(45) Date of Patent: Jan. 15, 2013

(54) METHOD AND APPARATUS FOR FIELD PICTURE CODING AND DECODING

(75) Inventors: Dae Hee Kim, Suwon-si (KR); Dae Sung Cho, Seoul (KR); Woong Il Choi, Hwaseong-si (KR); Hyun Mun Kim, Seongnam-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 986 days.

(21) Appl. No.: 12/382,001

(22) Filed: Mar. 5, 2009

(65) Prior Publication Data

US 2009/0238482 A1    Sep. 24, 2009

(30) Foreign Application Priority Data

Mar. 18, 2008   (KR) ................ 10-2008-0024972

(51) Int. Cl.
*G06K 9/36* (2006.01)
(52) U.S. Cl. ......... 382/238; 382/232; 382/233; 382/236
(58) Field of Classification Search ............. 382/232, 382/233, 235, 236, 238, 239, 240; 375/240.13, 375/240.16, E7.133; 348/699, 441
See application file for complete search history.

(56) References Cited

U.S. PATENT DOCUMENTS

| | | | | |
|---|---|---|---|---|
| 5,175,618 A | * | 12/1992 | Ueda et al. | ........... 375/240.13 |
| 2005/0053292 A1 | | 3/2005 | Mukerjee et al. | ........ 375/240.15 |
| 2007/0230578 A1 | | 10/2007 | Shi et al. | ................... 375/240.11 |

FOREIGN PATENT DOCUMENTS

WO    WO 2008/008331 A2    1/2008

OTHER PUBLICATIONS

European Search Report for European Patent Application No. 09723145.0 dated Aug. 9, 2011 (in English).
Schwarz et al., "Overview of the Scalable video Coding Extension of the H.264/AVC Standard", IEEE Transactions on Circuits and System for Video Technology, vol. 17, No. 9, Sep. 2007, pp. 1103-1120 (in English).
Zaccarin, "Block motion compensated coding of interlaced sequences using adaptively deinterlaced fields", Signal Processing: Image Communication 5, 1993, pp. 473-485 (in English).

* cited by examiner

*Primary Examiner* — Anh Hong Do
(74) *Attorney, Agent, or Firm* — Staas & Halsey LLP

(57) ABSTRACT

A field picture coding/decoding apparatus and method is provided. The field picture coding method includes selecting a reference field with respect to an input image, generating a predictive image by deinterlacing with respect to the selected reference field, and performing predictive coding with respect to the input image using the predictive image.

7 Claims, 12 Drawing Sheets

1200

METHOD AND APPARATUS FOR FIELD PICTURE CODING AND DECODING

CROSS-REFERENCE TO RELATED APPLICATIONS

This application claims the benefit under 35 U.S.C. §119 (a) of Korean Patent Application No. 10-2008-0024972, filed on Mar. 18, 2008, in the Korean Intellectual Property Office, the entire disclosure of which is incorporated herein by reference.

BACKGROUND

1. Field

One or more embodiments of the present invention relate to movie coding/decoding, and more particularly, to a field picture coding/decoding apparatus and method in a movie of an interlaced scanning scheme.

2. Description of the Related Art

Generally, movie coding uses predictive coding based on motion compensation in order to reduce a transmission bandwidth and to improve coding efficiency.

An interlaced scanning scheme performs sampling of an image of a single frame at different times, and samples alternately repeat by one line. Images sampled at different times are respectively referred to as a top field and a bottom field, and each field may be regarded as a single picture.

Improvement of coding efficiency, reverse compatibility, and forward compatibility when performing layered coding are required for movie coding/decoding of the interlaced scanning scheme.

SUMMARY

One or more embodiments provide a movie coding/decoding apparatus and method of an interlaced scanning scheme.

One or more embodiments also provide a coding/decoding apparatus and method to improve coding efficiency and provide reverse compatibility and forward compatibility when performing layered coding.

Additional aspects and/or advantages will be set forth in part in the description which follows and, in part, will be apparent from the description, or may be learned by practice of the embodiments.

According to an embodiment, there is provided a coding method, the method including: selecting a reference field with respect to an input image; generating a predictive image by deinterlacing with respect to the selected reference field; and performing predictive coding with respect to the input image using the predictive image.

According to another embodiment, there is provided a coding apparatus, the apparatus including: a reference image selection unit to select a reference field with respect to a current input image; a virtual field generation unit to perform deinterlacing with respect to the selected reference field and to generate a virtual field; and a mode selection unit to provide the virtual field as a predictive image for predictive coding based on coding efficiency.

According to still another embodiment, a decoding apparatus is provided. The decoding apparatus includes: a decoding unit to decode a received bit stream and to restore a reference field index; and a predictive restoration image generation unit to perform deinterlacing with respect to a reference filed corresponding to the reference field index, and to generate a predictive restoration image.

BRIEF DESCRIPTION OF THE DRAWINGS

These and/or other aspects and advantages will become apparent and more readily appreciated from the following description of embodiments, taken in conjunction with the accompanying drawings of which.

DETAILED DESCRIPTION

Figure 1:
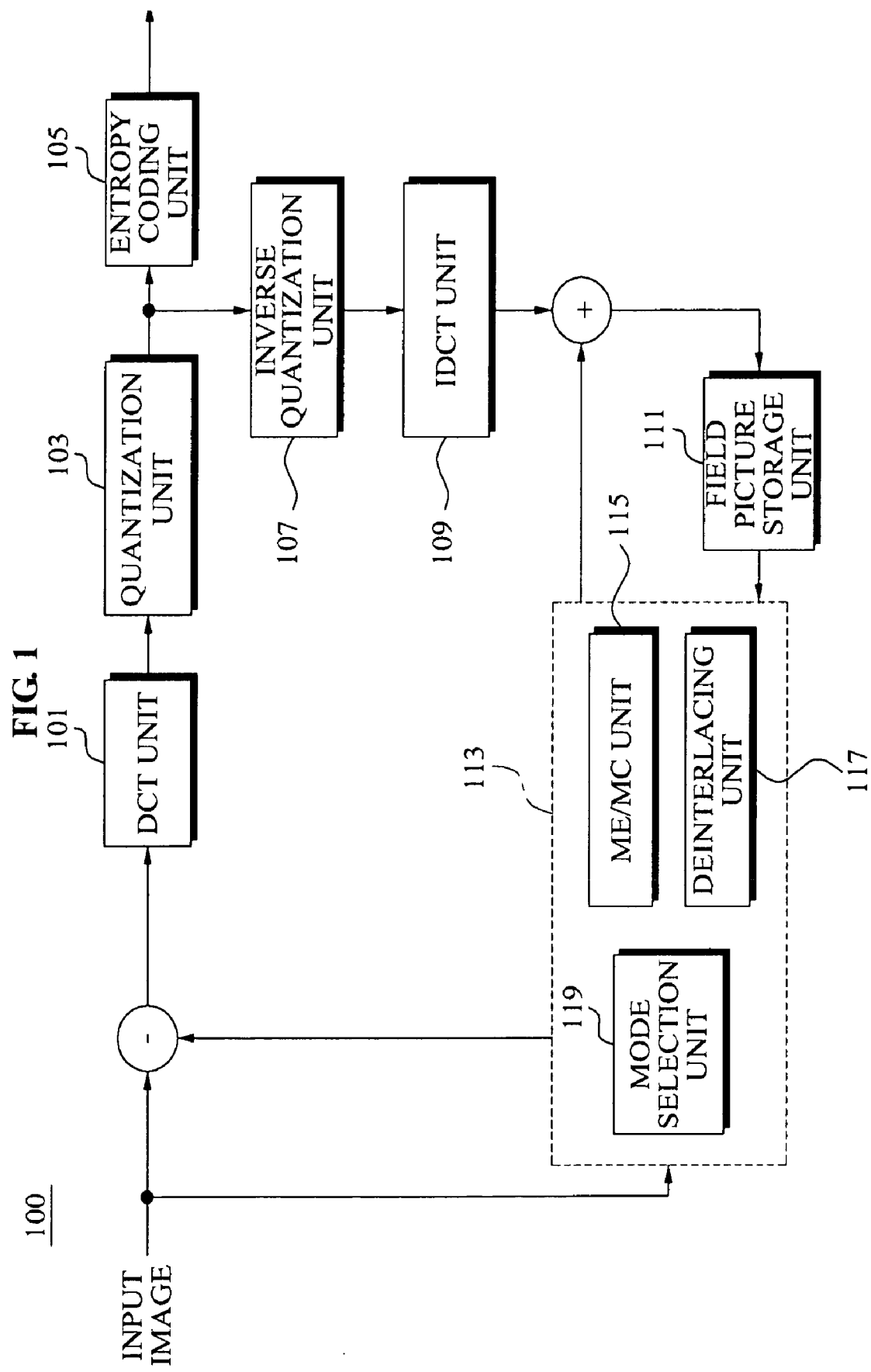
FIG. 1 illustrates a movie coding apparatus, according to an embodiment.

Reference will now be made in detail to embodiments, examples of which are illustrated in the accompanying drawings, wherein like reference numerals refer to the like elements throughout. Embodiments are described below to explain the present invention by referring to the figures.

FIG. 1 illustrates a movie coding apparatus 100, according to an embodiment.

Referring to FIG. 1, the movie coding apparatus 100 may include, for example, a Discrete Cosine Transform (DCT) unit 101, a quantization unit 103, an entropy coding unit 105, an inverse quantization unit 107, an Inverse Discrete Cosine Transform (IDCT) unit 109, a field picture storage unit 111, and a predictive image generation unit 113.

The movie coding apparatus 100 illustrated in FIG. 1 performs predictive coding using an input image and a predictive image.

In an embodiment, input image data may be composed by field picture.

The DCT unit 101 performs DCT of the input image data.

The quantization unit 103 quantizes the discrete cosine transformed image data.

The entropy coding unit 105 performs entropy coding of the image data quantized by the quantization unit 103.

The inverse quantization unit 107 inverse-quantizes the quantized image data.

The IDCT unit 109 performs IDCT of the inverse-quantized image data and restores the image data.

The field picture storage unit 111 stores the restored image data by field.

The predictive image generation unit 113 performs Motion Compensation (MC) using the current input image and image data of a previous field stored in the field picture storage unit 111, or performs deinterlacing, and generates the predictive image.

In an embodiment, the predictive image generation unit 113 may include a Motion Estimation/Motion Compensation (ME/MC) unit 115, a deinterlacing unit 117, and a mode selection unit 119.

The ME/MC unit 115 estimates a Motion Vector (MV) using the input image and the image data of the previous field stored in the field picture storage unit 111, and performs the MC using the estimated MV.

The deinterlacing unit 117 performs the deinterlacing using reference image data of the previous field stored in the field picture storage unit 111.

The mode selection unit 119 outputs the predictive image for which the MC is performed by the ME/MC unit 115 based on coding efficiency, or outputs the predictive image deinterlaced by the deinterlacing unit 117.

In an embodiment, the mode selection unit 119 may select the deinterlaced image with respect to an area including a small amount of motion as a reference image. The deinterlacing may be performed by a macro block composing a field. As described above, when the deinterlaced macro block is used as the reference image, the reference image appropriate for an interlaced scanning scheme may be selected, and the coding efficiency with respect to the area including the little motion may increase.

Hereinafter, a mode of outputting the predictive image deinterlaced by the deinterlacing unit 117 is defined as a deinterlacing mode.

Figure 2:
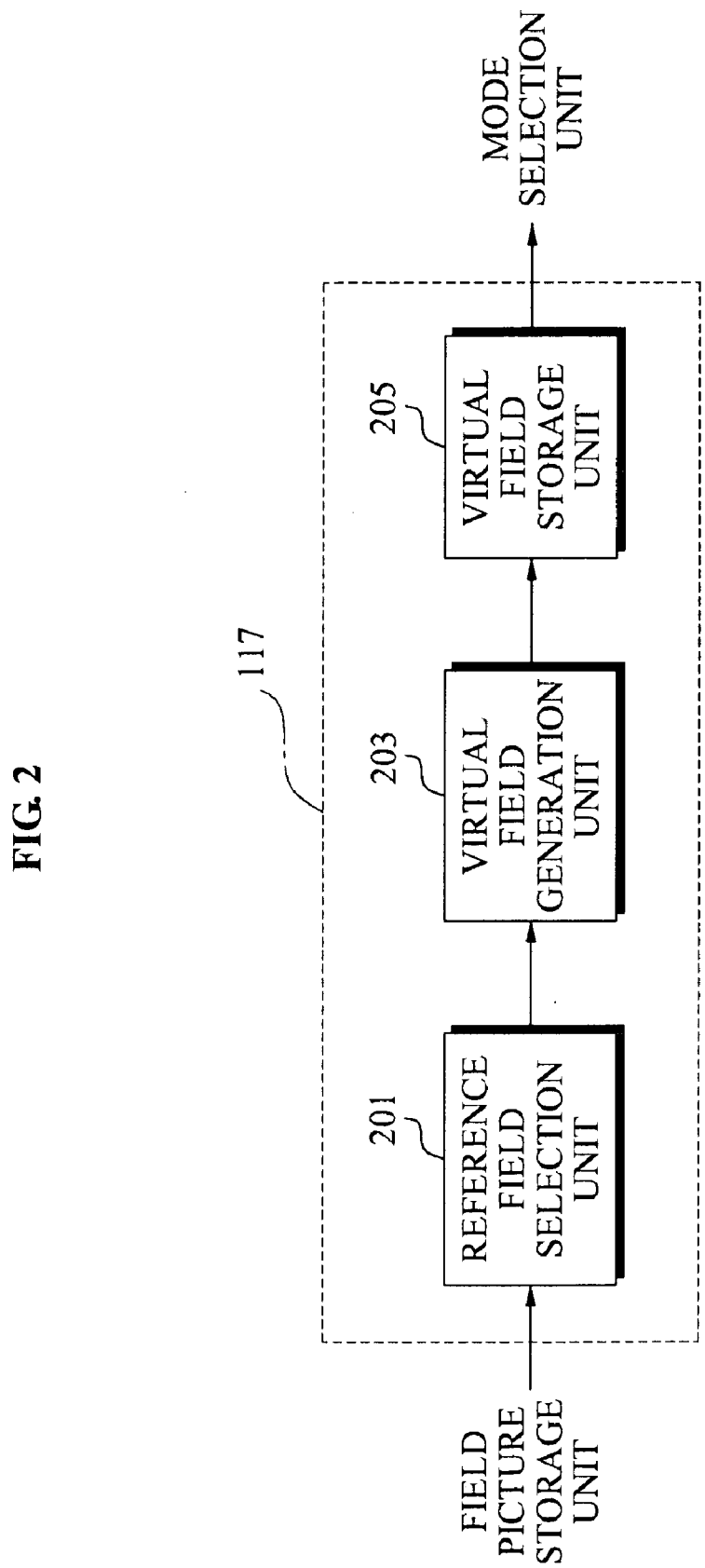
FIG. 2 illustrates a deinterlacing unit of FIG. 1.

FIG. 2 is illustrates the deinterlacing unit 117 of FIG. 1.

Referring to FIG. 2, the deinterlacing unit 117 may include a reference field selection unit 201, a virtual field generation unit 203, and a virtual field storage unit 205.

The reference field selection unit 201 selects a plurality of reference fields to perform deinterlacing from a reference field stored during a previous time slot.

Generally, deinterlacing is a process of generating a single frame using two fields. Therefore, according to an embodiment, since image data is stored by field, the reference field selection unit 201 may select two fields close in time to a current field as reference fields. A main reference field set by picture and a subsidiary reference field close in time to the current field are selected as the two reference fields.

The virtual field generation unit 203 performs deinterlacing using the selected main reference field and the selected subsidiary reference field, and generates a virtual field.

The virtual field generation unit 203 generates the virtual field by macro block using the reference field.

The virtual field storage unit 205 stores the virtual field generated by the virtual field generation unit 203. The virtual field stored in the virtual field storage unit 205 is provided as a predictive image based on mode selection.

Figure 3:
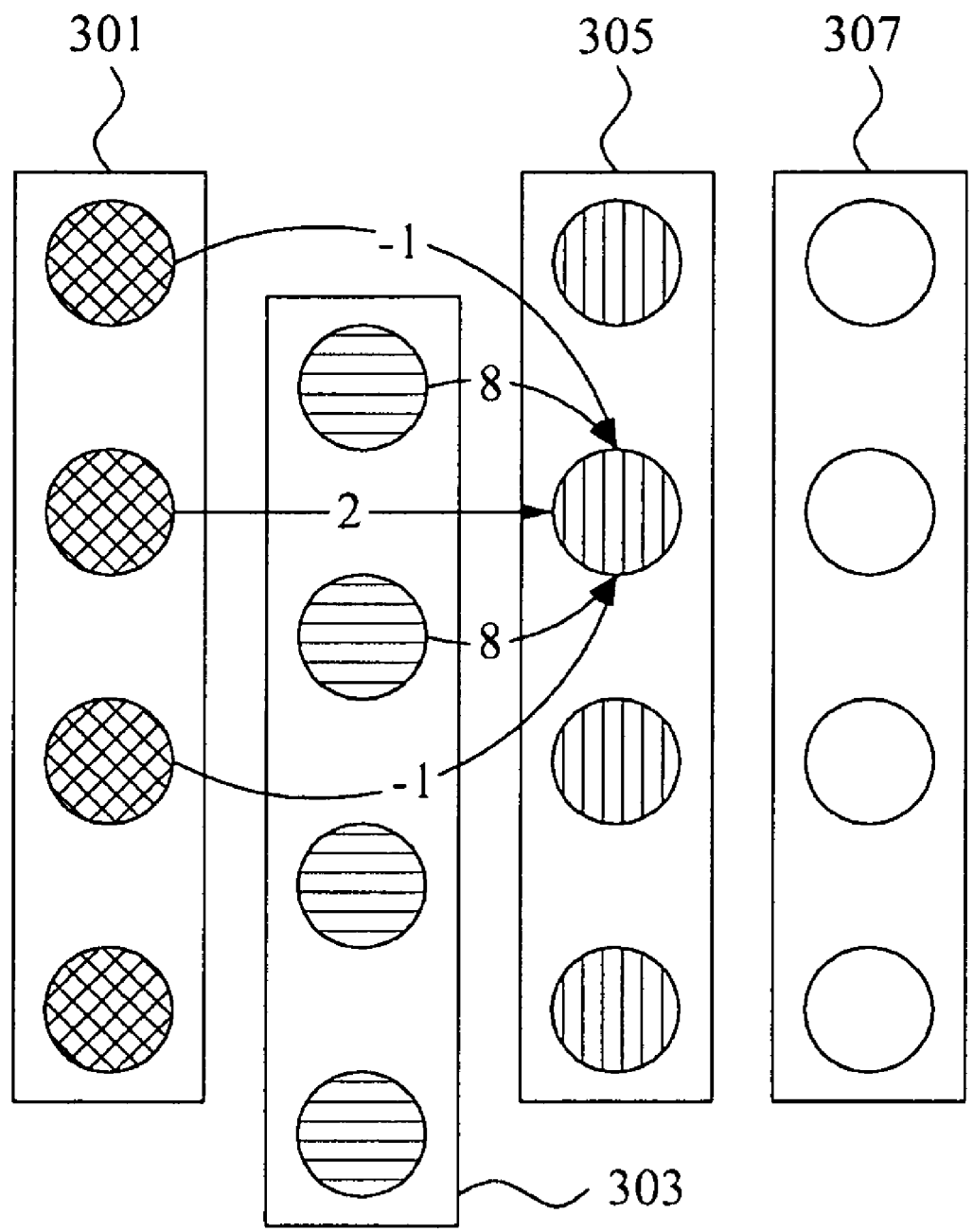
FIG. 3 illustrates an example for describing a relation between a reference field and a virtual field, according to an embodiment.

FIG. 3 illustrates an example describing a relation between a reference field and a virtual field when a main reference field is an immediately preceding field in time from a current field and is a bottom field, according to an embodiment.

Referring to FIG. 3, the reference field selection unit 201 selects a first reference field 303 closest to a current field 307 as the main reference field. Since the current field 307 is the top field, the first reference field 303 is the bottom field including an opposite polarity to the current field 307. The reference field selection unit 201 selects a second reference field 301 being closest in time to the current field 307 and including the same polarity as the current field 307 as a subsidiary reference field for deinterlacing.

The virtual field generation unit 203 generates a virtual field 305 for predictive coding using the first reference field 303 and the second reference field 301. In FIG. 3, numbers denote examples of a filter coefficient for the deinterlacing. The filter coefficient may be variously set based on the main reference field, the subsidiary reference field, and a macro block location in a field.

Figure 4:
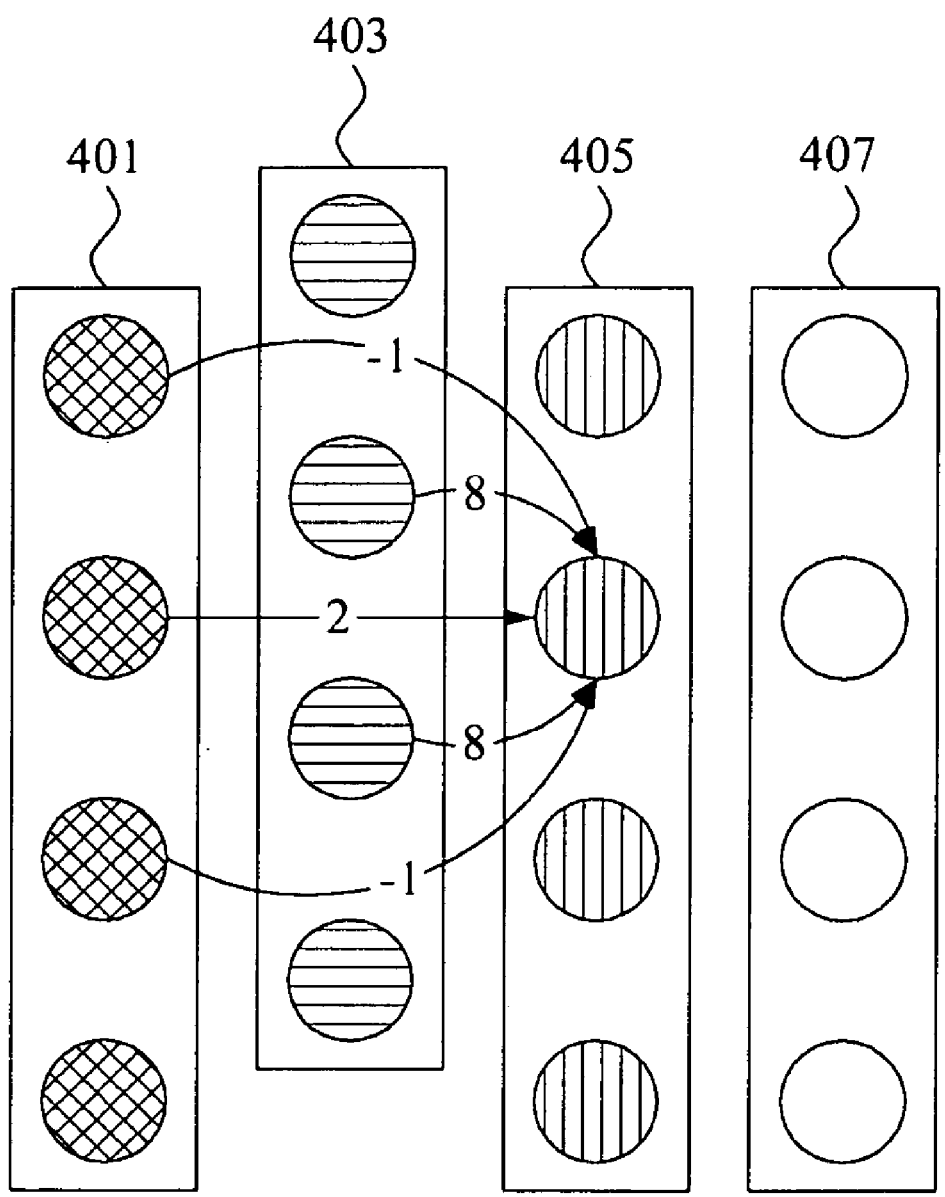
FIG. 4 illustrates another example for describing a relation between a reference field and a virtual field, according to an embodiment.

FIG. 4 illustrates another example for describing a relation between a reference field and a virtual field when a main reference field 403 is an immediately preceding field in time from a current field 407 and is a top field, according to an embodiment.

A difference between FIG. 4 and FIG. 3 is that in FIG. 4 a current field 407 and a subsidiary reference field 401 are bottom fields and the main reference field 403 is the top field.

As described above, the virtual field generation unit 203 generates a virtual field 405 for predictive coding using the main reference field 403 and the subsidiary reference field 401.

Figure 5:
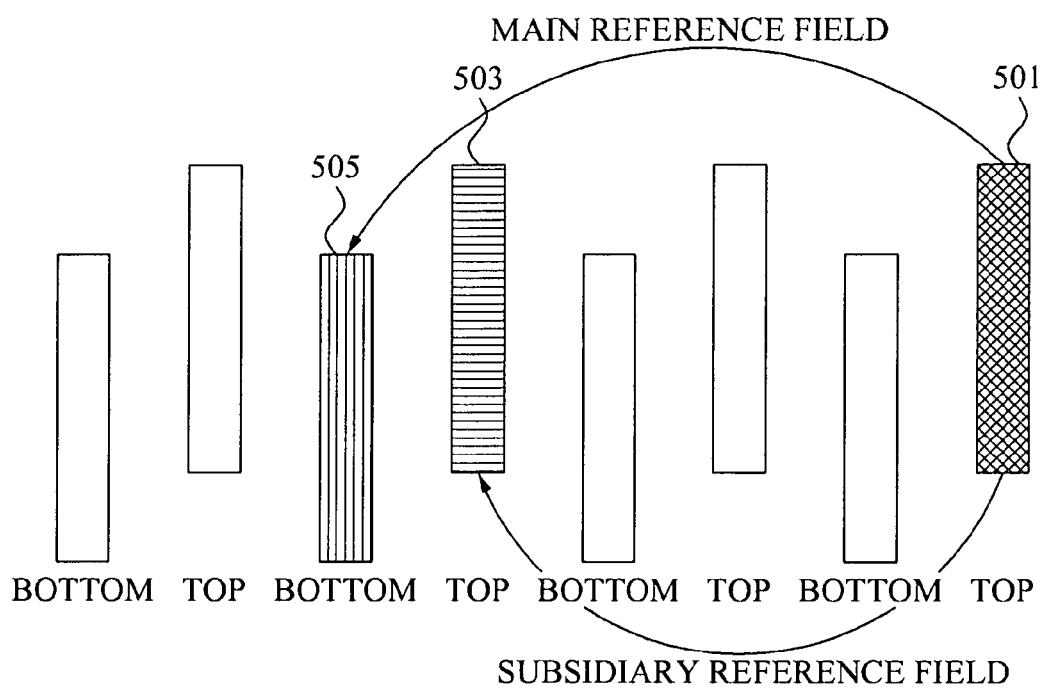
FIG. 5 illustrates an example in which a main reference field is not an immediately preceding field in time and includes an opposite polarity to a current field when using a multiple reference, according to an embodiment.

FIG. 5 illustrates an example in which a main reference field 505 is not an immediately preceding field in time and includes an opposite polarity to a current field when using a multiple reference, according to an embodiment.

Referring to FIG. 5, the main reference field 505 from among a plurality of candidate fields is not the immediately preceding field in time of a current field 501, the current field 501 is a top field, and the main reference field 505 is a bottom field. A subsidiary reference field 503 to perform deinterlacing is closer in time to the current field 501 than the main reference field 505 and is the top field close to the main reference field 505.

Since a location of a pixel is appropriate when polarities of the current field 501 and the main reference field 505 are the same, different from a case where polarities are opposite, a deinterlacing mode is not performed.

Figure 6:
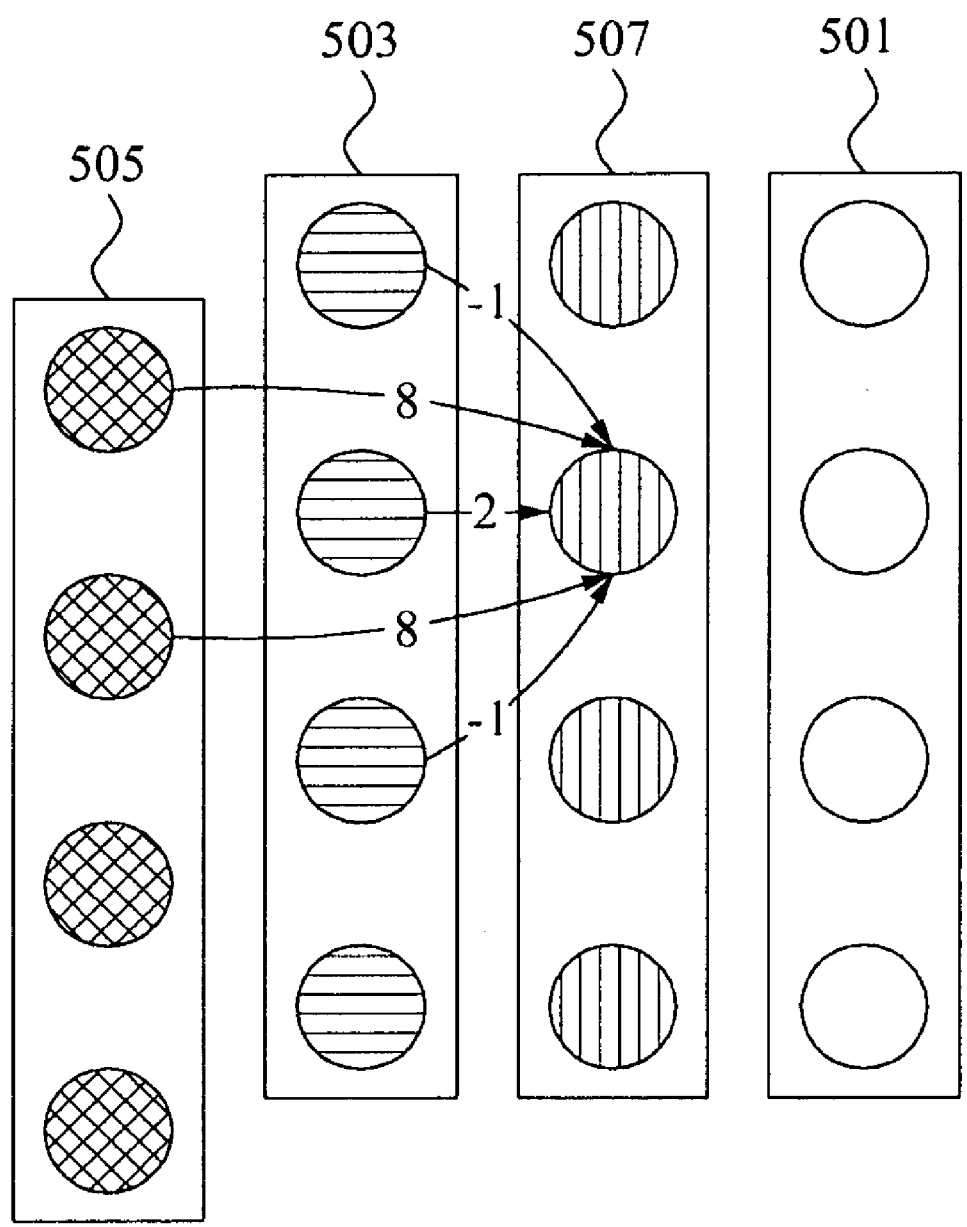
FIG. 6 illustrates a relation between a reference field and a virtual field in FIG. 5.

FIG. 6 illustrates a relation between a reference field and a virtual field 507 in FIG. 5.

In FIG. 6, the current field 501 is a top field. The main reference field 505 is separated from the current field 501 by three fields or more, and includes a polarity different from the current field 501. The subsidiary reference field 503 includes the same polarity as the current field 501, is closer in time to the current field 501 than the main reference field 505, and is a field close to the main reference field 505. The virtual field generation unit 203 generates the virtual field 507 using the main reference field 505 and the subsidiary reference field 503.

Figure 7:
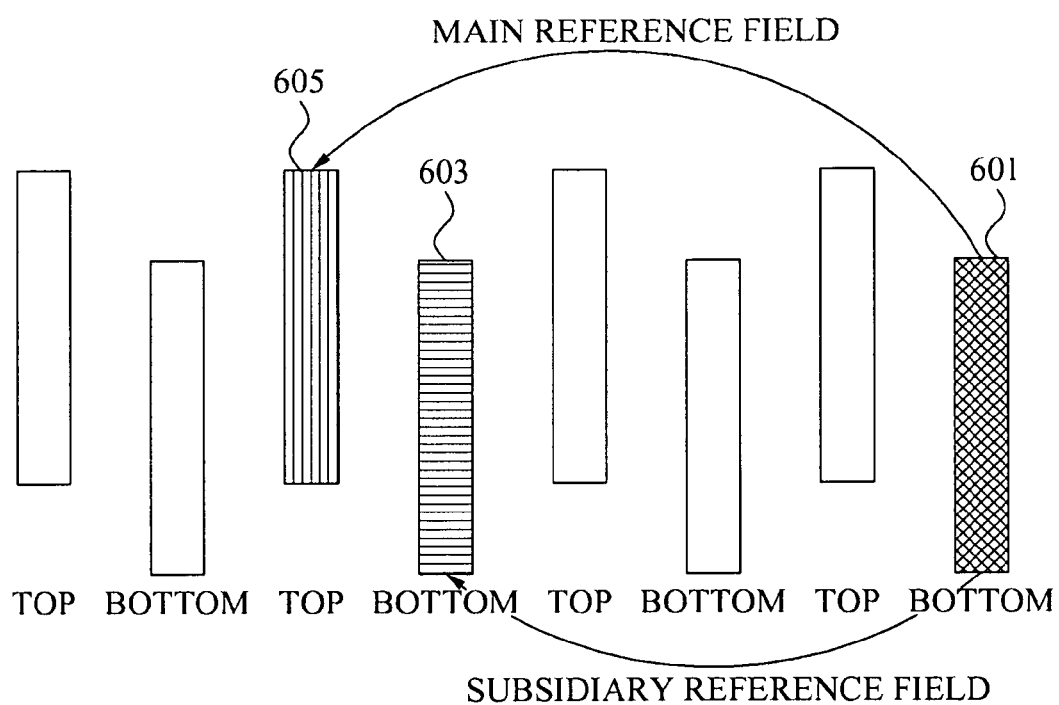
FIG. 7 illustrates another example in which a main reference field is not an immediately preceding field in time and includes an opposite polarity to a current field when using a multiple reference, according to an embodiment.

FIG. 7 illustrates another example in which a main reference field 605 is not an immediately preceding field in time and includes an opposite polarity to a current field 601 when using a multiple reference, according to an embodiment.

Referring to FIG. 7, the main reference field 605, from among a plurality of candidate fields, is not an immediately preceding field of the current field 601 in time, the current field 601 is a bottom field, and the main reference field 605 is a top field. A subsidiary reference field 603 to perform deinterlacing is closer in time to the current field 601 than the main reference field 605, and is a bottom field close to the main reference field 605.

Since a pixel location is appropriate when polarities of the current field 601 and the main reference field 605 are the same, different from a case in which polarities are opposite, a deinterlacing mode is not performed.

Figure 8:
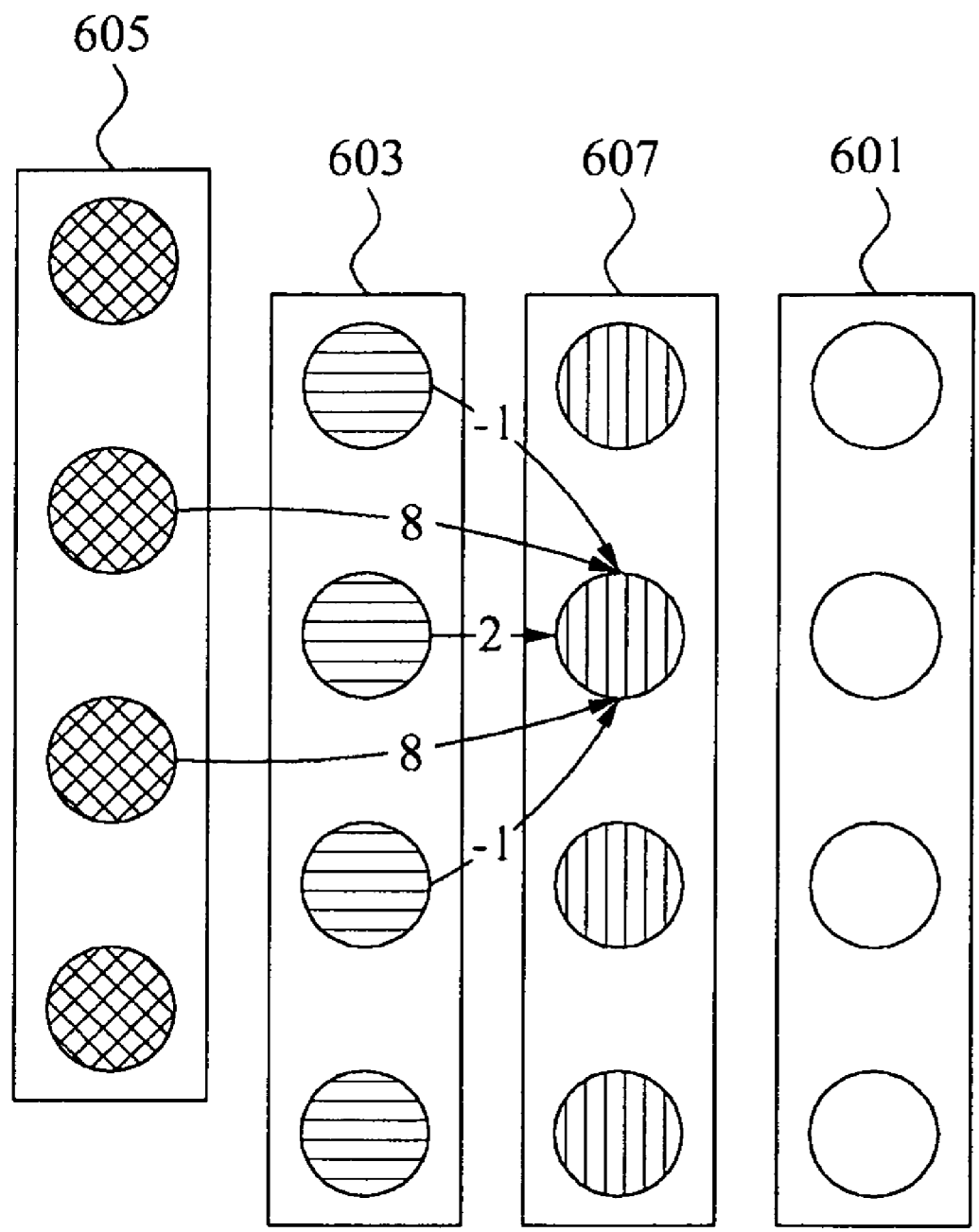
FIG. 8 illustrates a relation between a reference field and a virtual field in FIG. 7.

FIG. 8 illustrates a relation between a reference field and a virtual field 607 in FIG. 7.

In FIG. 8, the current field 601 is a bottom field. The main reference field 605 is separated from the current field 601 by three or more, and includes a polarity different from the current field 601. The subsidiary reference field 603 includes the same polarity as the current field 601, is closer in time to the current field 601 than the main reference field 605, and is a field close to the main reference field 605. The virtual field generation unit 203 generates the virtual field 607 using the main reference field 605 and the subsidiary reference field 603.

Figure 9:
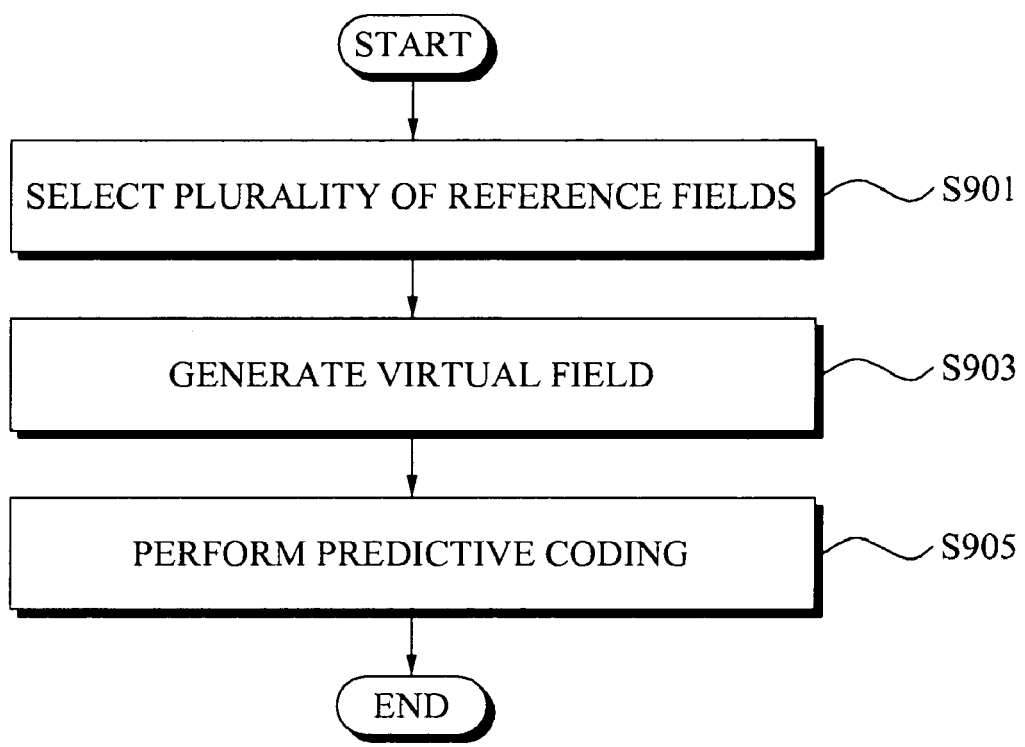
FIG. 9 illustrates a deinterlacing mode in a field picture coding method, according to an embodiment.

FIG. 9 illustrates a deinterlacing mode in a field picture coding method, according to an embodiment.

In operation S901, a field picture coding apparatus selects a main reference field stored during a previous time slot and a subsidiary reference field based on the main reference field.

The main reference field and the subsidiary reference field based on the main reference field may be selected by any one of the methods described with reference to FIGS. 3, 4, 5, and 7.

In operation S903, the field picture coding apparatus generates a predictive image by deinterlacing with respect to the reference field. The field picture coding apparatus generates a virtual field using the reference field, and selects the generated virtual field as the predictive image.

The field picture coding apparatus generates a virtual macro block using a corresponding macro block of the reference field.

In operation S905, the field picture coding apparatus performs predictive coding using a current input image and the predictive image.

In an embodiment, the field picture coding apparatus codes a reference field index and transmits the reference field index to a decoder. Accordingly, the decoder may perform decoding corresponding to the above-described coding process using the reference field index.

Figure 10:
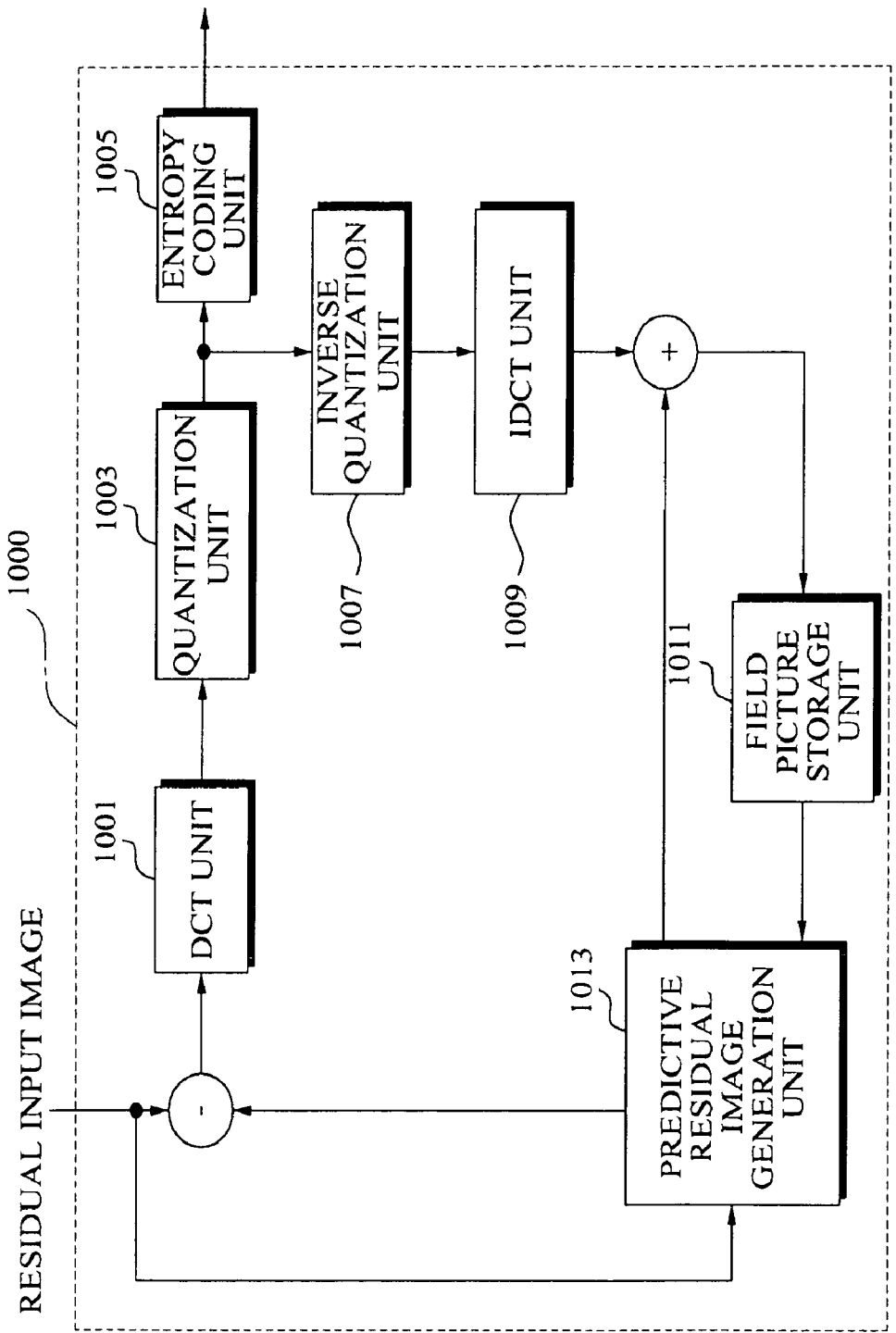
FIG. 10 illustrates a field picture coding apparatus for performing layered coding, according to an embodiment.

FIG. 10 illustrates a field picture coding apparatus for performing layered coding, according to an embodiment.

Referring to FIG. 10, the field picture coding apparatus includes a base layer coding unit (not shown) to perform coding of a base layer and an enhancement layer coding unit 1000.

The base layer coding unit generates a bit stream securing a basic picture quality and transmits the bit stream to a decoder.

The enhancement layer coding unit 1000 codes a residual image denoting a difference between an input image and a restoration image restored from an output bit stream of the basic layer coding unit, and transmits the residual image to the decoder.

The enhancement layer coding unit 1000 includes a DCT unit 1001, a quantization unit 1003, an entropy coding unit 1005, an inverse quantization unit 1007, and an IDCT unit 1009, a field picture storage unit 1011, and a predictive residual image generation unit 1013.

The DCT unit 1001 performs DCT to acquire spatial overlapping of a residual input image.

The quantization unit 1003 quantizes the discrete cosine transformed residual image.

The entropy coding unit 1005 performs entropy coding of the residual image quantized by the quantization unit 1003.

The inverse quantization unit 1007 inverse-quantizes the quantized residual image.

The IDCT unit 1009 performs IDCT of the inverse-quantized residual image and restores the residual image.

The field picture storage unit 1011 stores the restored residual image by field.

The predictive residual image generation unit 1013 performs MC using the current residual input image and a residual image of a previous field stored in the field picture storage unit 1011, or performs deinterlacing, and generates the predictive residual image.

In an embodiment, the predictive residual image generation unit 1013 may output the predictive residual image for which ME and MC are performed based on coding efficiency, or output the deinterlaced predictive residual image.

The predictive residual image generation unit 1013 performs a function similar to the predictive image generation unit 113 of FIG. 1, excluding a point of providing the predictive residual image with respect to the residual image. Accordingly, a method of selecting a reference residual field and a method of generating a virtual residual field may use the above-described reference field selection method and the above-described virtual field generation method.

Figure 11:
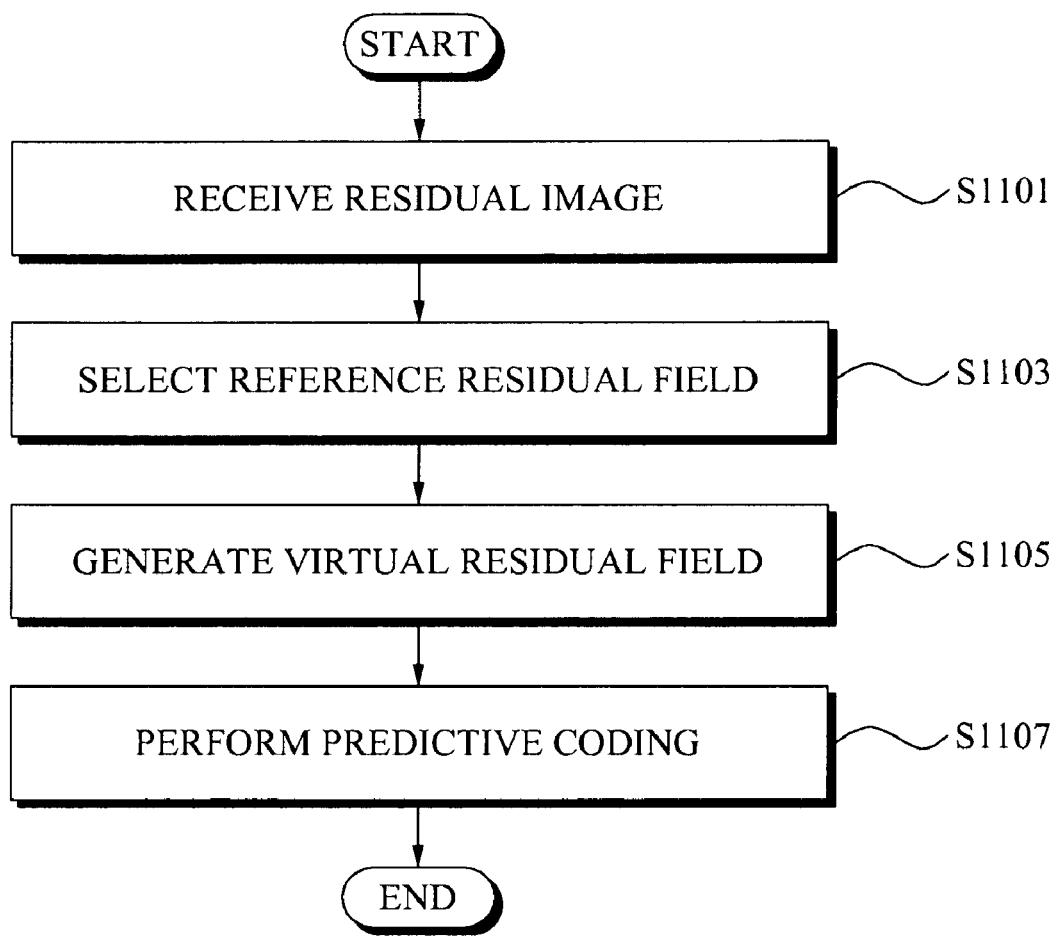
FIG. 11 illustrates a deinterlacing mode in a field picture coding method of an enhancement layer coding unit, according to an embodiment.

FIG. 11 illustrates a deinterlacing mode in a field picture coding method of the enhancement layer coding unit 1000, according to an embodiment.

In operation S1101, the enhancement layer coding unit 1000 receives a residual image denoting a difference between an input image and a restoration image restored from an output bit stream of the basic layer coding unit.

In operation S1103, the enhancement layer coding unit 1000 selects a main reference field from residual fields stored during a previous time slot and a subsidiary reference field based on the main reference field.

In operation S1105, the enhancement layer coding unit 1000 generates a virtual residual field using the reference residual field. The virtual residual field is a predictive residual image for predictive coding of the residual image.

The enhancement layer coding unit 1000 generates a virtual macro block using a corresponding macro block of the reference residual field.

In operation S1107, the enhancement layer coding unit 1000 performs the predictive coding using a current residual input image and the predictive residual image.

In an embodiment, the enhancement layer coding unit 1000 codes a reference residual field index and transmits the reference residual field index to a decoder. Accordingly, the decoder may perform decoding corresponding to a coding process using the reference residual field index.

According to a field picture coding apparatus to perform layered coding and a field picture coding method of an enhancement layer coding unit, it is possible to improve coding efficiency in a layered coding scheme to support various movie formats.

Base layer coding may perform coding of a conventional interlaced scanning scheme, and enhancement layer coding uses the above-described field picture coding method, thereby providing reverse compatibility and forward compatibility when performing layered coding.

Figure 12:
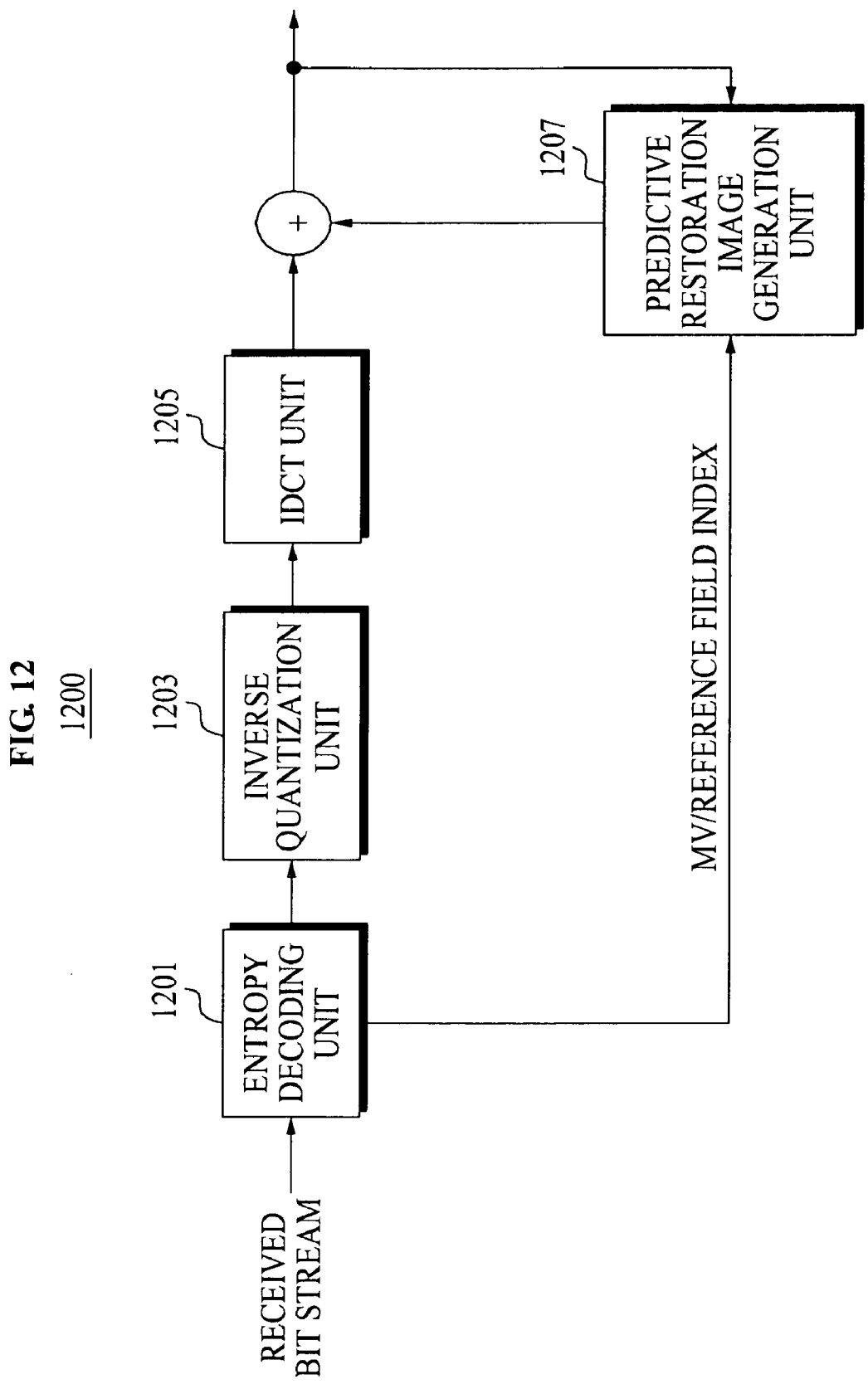
FIG. 12 illustrates a field picture decoding apparatus, according to an embodiment.

FIG. 12 illustrates a field picture decoding apparatus 1200, according to an embodiment.

Referring to FIG. 12, the field picture decoding apparatus 1200 includes an entropy decoding unit 1201, an inverse quantization unit 1203, an IDCT unit 1205, and a predictive restoration image generation unit 1207.

The entropy decoding unit 1201 performs entropy decoding of a received bit stream. The received bit stream includes an MV or a reference field index, and the entropy decoding unit 1201 provides the predictive restoration image generation unit 1207 with the MV or the reference field index.

The inverse quantization unit 1203 inverse-quantizes the entropy-decoded bit stream.

The IDCT unit 1205 performs IDCT of the inverse-quantized bit stream and restores image data.

The predictive restoration image generation unit 1207 generates a predictive restoration image for predictive decoding using the MV or the reference field index.

When the received bit stream is predictive-coded by deinterlacing, the predictive restoration image generation unit 1207 generates the predictive restoration image corresponding to the predictive-coded bit stream.

The predictive restoration image generation unit 1207 selects a main reference field corresponding to the reference field index from fields restored during a previous time, selects a subsidiary reference field based on the selected main reference field, and generates a virtual field. The virtual field corresponds to the predictive restoration image for the predictive decoding.

Since the reference field index is transmitted from an encoder, the subsidiary reference field is selected based on a temporal location of the main reference field.

When the reference field index indicates a field closest to a current field as main reference field, the corresponding main reference field is a reference field of an opposite polarity to the current field. Accordingly, the subsidiary reference field is a field second close to the current field, and includes the same polarity as the current field.

When the reference field index is a random field not being the closest field in a field picture storage unit and indicates a field including a different polarity from the current field as the main reference field, the subsidiary reference field is closer in time to the current field than the main reference field, and a field adjacent to the main reference field is selected. The subsidiary reference field includes the same polarity as the current field.

When the reference field index indicates a field of the same polarity as the current field as the main reference field, a deinterlacing mode is not performed.

The field picture coding/decoding method according to the above-described embodiments may be recorded in computer-readable media including program instructions to implement various operations embodied by a computer. The media may also include, alone or in combination with the program instructions, data files, data structures, and the like. In addition, other embodiments may also be implemented through computer readable code/instructions in/on a media/medium, e.g., a computer readable medium, to control at least one processing element to implement any of the above described embodiments.

The computer readable code may be recorded/transferred in computer-readable media including program instructions to implement various operations embodied by a computer. Examples of computer-readable media include magnetic media such as hard disks, floppy disks, and magnetic tape; optical media such as CD ROM disks, DVD disks and Blu Ray disks; magneto-optical media such as optical disks; and hardware devices that are specially configured to store and perform program instructions, such as read-only memory (ROM), random access memory (RAM), flash memory, and the like. The recorded media may also be transmitted over a transmission medium such as optical or metallic lines, wave guides, etc. including a carrier wave transmitting signals specifying the program instructions, data structures, etc.

Examples of program instructions include both machine code, such as produced by a compiler, and files containing higher level code that may be executed by the computer using an interpreter. The described hardware devices may be configured to act as one or more software modules in order to perform the above-described embodiments.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A field picture coding method, the method comprising:
    selecting a reference field from a plurality of candidate fields with respect to an input image, wherein the selecting comprises selecting a single closest field in time to the input image as a main reference field and selecting a second closest field in time to the input image as a subsidiary reference field;
    generating a predictive image by deinterlacing with respect to the selected reference field; and
    performing, by way of a processor, predictive coding with respect to the input image using the predictive image.

2. The method of claim 1, wherein the input image is a residual image for layered coding.

3. A field picture coding apparatus, the apparatus comprising:
    a reference image selection unit to select a reference field from a plurality of candidate fields with respect to an input image, wherein the selecting of the reference field by the reference image selection unit comprises selecting a single closest field in time to the input image as a main reference field and selecting a second closest field in time to the input image as a subsidiary reference field;
    a virtual field generation unit to perform deinterlacing with respect to the selected reference field and to generate a virtual field; and
    a mode selection unit to provide the virtual field as a predictive image for predictive coding based on coding efficiency.

4. The apparatus of claim 3, wherein the input image is a residual image for layered coding.

5. The apparatus of claim 3, wherein the mode selection unit selects any one of a motion prediction mode and a deinterlacing mode for the predictive coding, and provides the predictive image.

6. A field picture decoding apparatus, the apparatus comprising:
    a decoding unit to decode a received bit stream and to restore a reference field index; and
    a predictive restoration image generation unit to perform deinterlacing with respect to a reference field corresponding to the reference field index, and to generate a predictive restoration image, wherein the reference field comprises a single closest field in time to the input image that has been selected as a main reference field and a second closest field in time to the input image that has been selected as a subsidiary reference field.

7. The apparatus of claim 6, wherein the received bit stream is a bit stream corresponding to a residual image for layered coding.

* * * * *